(12) United States Patent
Waisel et al.

(10) Patent No.: US 9,380,434 B2
(45) Date of Patent: Jun. 28, 2016

(54) METHOD AND APPARATUS FOR LOCATION BASED AD HOC GROUP CREATION FOR MESSAGING

(71) Applicant: Vonage America Inc., Holmdel, NJ (US)

(72) Inventors: Tali Waisel, Tel Aviv (IL); Elad Zarko, Kfar Saba (IL); Golan Malki, Tel Aviv (IL); Ido Mintz, Burgata (IL)

(73) Assignee: Vonage America Inc., Holmdel, NJ (US)

( * ) Notice: Subject to any disclaimer, the term of this patent is extended or adjusted under 35 U.S.C. 154(b) by 0 days.

(21) Appl. No.: 14/087,675

(22) Filed: Nov. 22, 2013

(65) Prior Publication Data
US 2015/0148082 A1    May 28, 2015

(51) Int. Cl.
| | |
|---|---|
| H04B 7/00 | (2006.01) |
| H04W 4/12 | (2009.01) |
| H04W 4/00 | (2009.01) |
| H04W 4/08 | (2009.01) |

(52) U.S. Cl.
CPC ............... *H04W 4/12* (2013.01); *H04W 4/008* (2013.01); *H04W 4/08* (2013.01)

(58) Field of Classification Search
CPC ......... H04W 4/08; H04W 4/02; H04W 4/023; H04W 4/008; H04W 4/12; H04W 4/18; G06Q 50/01
USPC ............................ 455/518, 519, 404.2, 456.1
See application file for complete search history.

(56) References Cited

U.S. PATENT DOCUMENTS

| | | | |
|---|---|---|---|
| 2006/0111135 A1* | 5/2006 | Gray et al. ..................... 455/519 |
| 2007/0150444 A1* | 6/2007 | Chesnais et al. .................. 707/3 |
| 2012/0023072 A1* | 1/2012 | Garg ............................. 707/689 |
| 2013/0095801 A1* | 4/2013 | Kermoian et al. .......... 455/414.1 |
| 2014/0129626 A1* | 5/2014 | Smadi ........................... 709/204 |
| 2015/0066915 A1* | 3/2015 | Golder et al. ................. 707/723 |

* cited by examiner

*Primary Examiner* — Thai Vu
(74) *Attorney, Agent, or Firm* — Moser Taboada; Joseph Pagnotta

(57) ABSTRACT

Methods and apparatuses for ad-hoc group messaging are provided herein. In some embodiments, methods for ad-hoc group messaging may include detecting two or more subscribers proximate a common location, creating an ad-hoc group including contact information of the two or more subscribers proximate the common location, and transmitting information associated with the ad-hoc group to a device of each of the two or more subscribers associated with the ad-hoc group.

15 Claims, 6 Drawing Sheets

METHOD AND APPARATUS FOR LOCATION BASED AD HOC GROUP CREATION FOR MESSAGING

BACKGROUND

1. Field

Embodiments of the present invention generally relate to methods and apparatus for location based ad-hoc group creation for messaging.

2. Description of the Related Art

Often, the need to message a group of contacts arises when attending an event or going to particular location to coordinate activities. In order to accomplish this, one person must assemble all the contact identifiers, and create and send a message to the contacts. Once a group message is established, each participant in the group may continue the group interaction. However, to establish the group, one participant must individually and manually add each group member to the group, taking time and effort in the assembly of the group.

Therefore, there is a need in the art to provide ability to form ad-hoc groups comprising contacts at an event in accordance with exemplary embodiments of the present invention.

SUMMARY

Methods and apparatuses for ad-hoc group messaging are provided herein. In some embodiments, methods for ad-hoc group messaging may include detecting two or more subscribers proximate a common location, creating an ad-hoc group including contact information of the two or more subscribers proximate the common location, and transmitting information associated with the ad-hoc group to a device of each of the two or more subscribers associated with the ad-hoc group.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
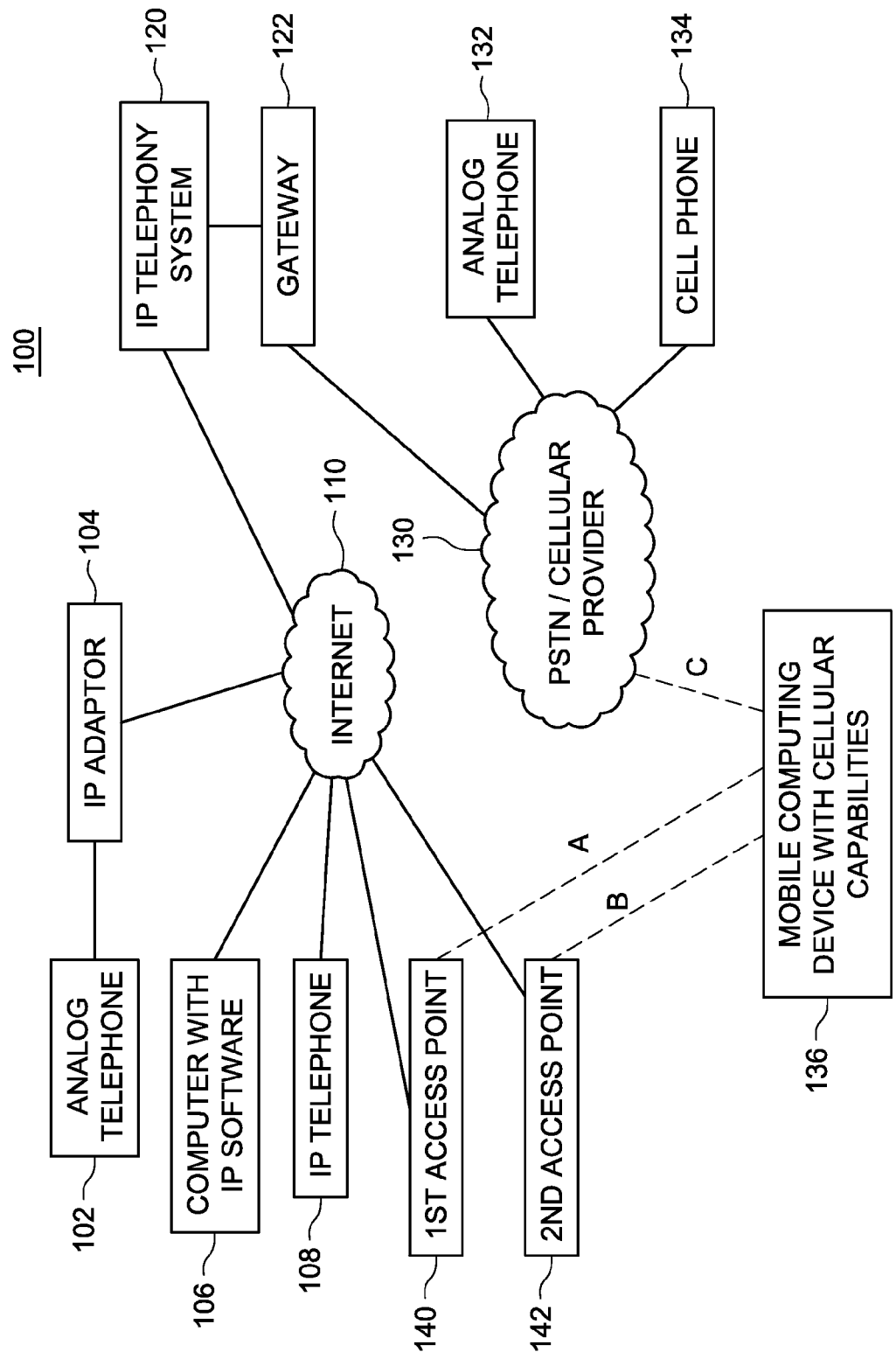
FIG. 1 illustrates a communications environment provided to facilitate IP enhanced communications in accordance with exemplary embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and apparatus for location based ad-hoc group messaging. According to one embodiment, a method detects a concentration of individuals subscribed to a common service in a given geographic location. An ad-hoc group is created containing contact information of the proximate subscribers to enable group messaging between the subscribers. Each subscriber's device receives the ad-hoc group contact list facilitating group communication. In other embodiments, the individuals need not be subscribed to a common service, but merely may be occasional users of a mobile application enabling location-based ad-hoc group formation.

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text and video communications using Internet protocol data communications.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize the data channel of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may be provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE iPhone™, that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an APPLE iPhone™, a RIM BLACKBERRY or a comparable device running GOOGLE's ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE iPod Touch™ and the iPad™. Such a device may act as a mobile telephony device once it is configured with appropriate application software.

FIG. 1 illustrates that a mobile computing device with cellular capabilities 136 is capable of establishing a first wireless data connection A with a first wireless access point 140, such as a WIFI or WIMAX router. The first wireless access point 140 is coupled to the Internet 110. Thus, the mobile computing device 136 can establish a VOIP telephone call with the IP telephony system 120 via a path through the Internet 110 and the first wireless access point 140.

FIG. 1 also illustrates that the mobile computing device 136 can establish a second wireless data connection B with a second wireless access point 142 that is also coupled to the Internet 110. Further, the mobile computing device 136 can establish a third wireless data connection C via a data channel provided by a cellular service provider 130 using its cellular telephone capabilities. The mobile computing device 136 could also establish a VOIP telephone call with the IP telephony system 120 via the second wireless connection B or the third wireless connection C.

Although not illustrated in FIG. 1, the mobile computing device 136 may be capable of establishing a wireless data connection to a data network, such as the Internet 110, via alternate means. For example, the mobile computing device 136 might link to some other type of wireless interface using an alternate communication protocol, such as the WIMAX standard.

Figure 2:
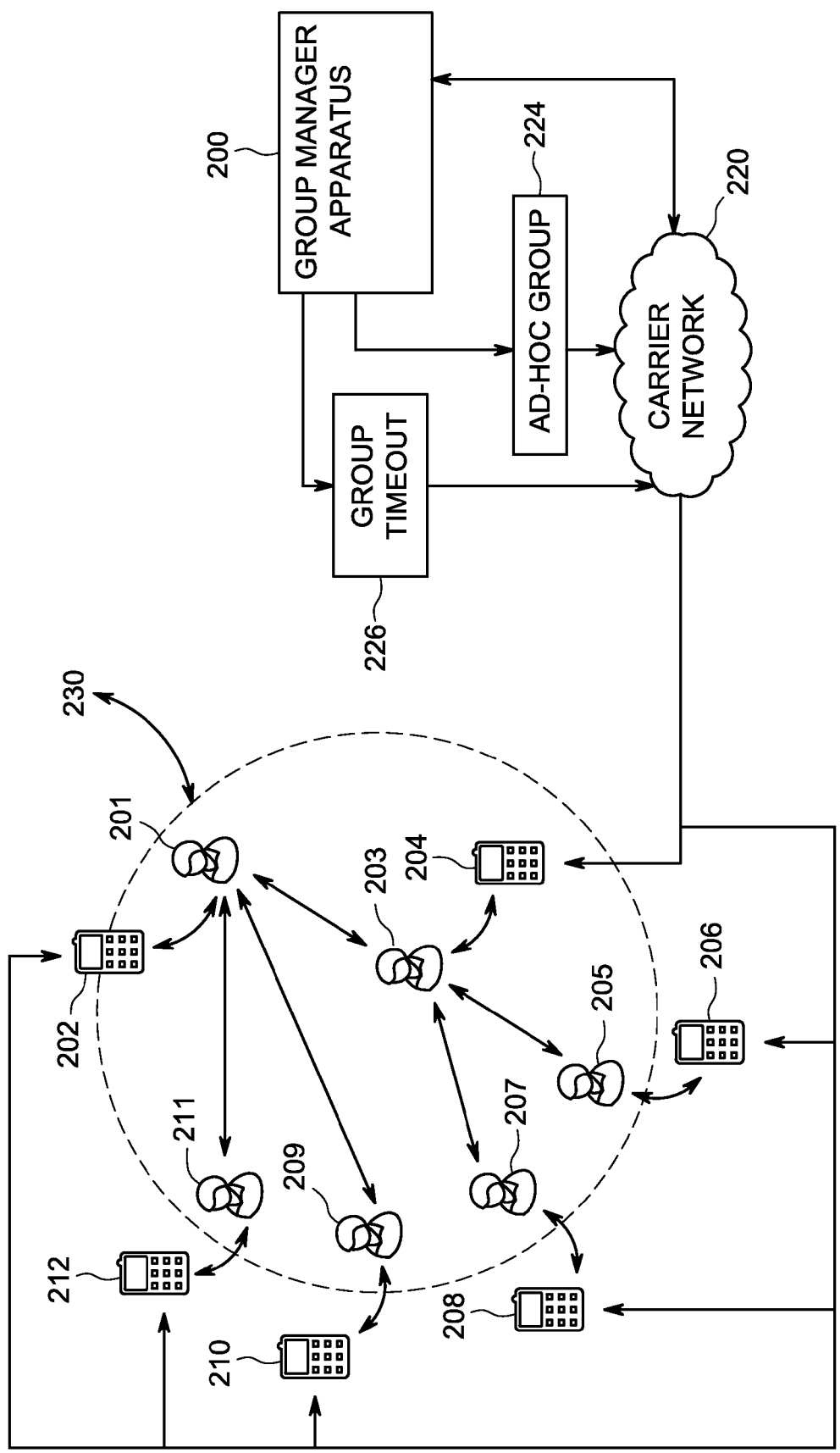
FIG. 2 is functional block diagram of the group manager apparatus in accordance with exemplary embodiments of the present invention.

FIG. 2 is functional block diagram of the group manager apparatus 200 in accordance with exemplary embodiments of the present invention. A group of subscribers, for example, subscriber 201, subscriber 203, subscribers 205, subscribers 207, subscribers 209 and subscribers 211, are located proximally within a common location, radius 230 (centered, for example, approximately around subscriber 203), and all subscribers are subscribed to a telephony service, for example, a VoIP service, though this is merely exemplary and is not required. In some embodiments, the subscribers may be users of a mobile application and not necessarily "subscribed" to the same telephony service. For example, each subscriber may access an application for location-based ad-hoc group messaging and not be subscribed to other and more comprehensive features of the VoIP service. Each subscriber is using a device, respectively, device 202, device 204, device 206, device 208, device 210 and device 212. Subscriber 201 has a list of contacts on their device 202, the contacts list containing contact information for subscriber 203, subscriber 209 and subscriber 211 (indicated by the arrows in FIG. 2) as well as other contacts. The contact list may also comprise other groups of contacts, created by the subscriber 201. Subscriber 203 also has a contact list on their device 204, containing contact information for subscriber 205 and subscriber 207, in addition to other contacts and groups of contacts. Each subscriber is able to individually communicate with other subscribers over the carrier network 220.

According to one embodiment, the group manager apparatus 200 operates over a carrier network 220, i.e., internet 110 or PSTN/cellular provider network 130, and detects clusters of subscribers. However, those of ordinary skill in the art will recognize that any data access (such as WiFi) may be used to operate the group manager apparatus 200. If each of the subscribers has enabled location publication and group messaging, the group manager apparatus 200 is given access to subscriber location and determines that the subscribers 201-211 are located close to each other within the predetermined and configurable radius 230. In some embodiments, each device 202-212 is executing a telephony application that transmits such location data (among other data regarding the subscriber such as an identifier, name, subscription information, contact list information, and the like) to the carrier network 220. In other embodiments, global positioning satellite (GPS) or other geolocation identifying means may be used in conjunction with the location available via the telephony application executing on each device to determine proximity between a set of subscribers/devices. In some embodiments, GPS may be used as the primary location identification means. In other embodiments, the group manager apparatus 200 selects an appropriate system to identify the location based on accuracy required. For example, the apparatus 200 may select WiFi location tracking, cell tower triangulation, proximity protocols such as BLUETOOTH, proprietary protocols such as APPLE Bonjour®, or the like. Proximate subscribers need not be within a particular radius. The group manager apparatus 200 can be configured to add subscribers who are in any geometrically and geographically defined region.

According to another embodiment, each device may contain near-field communications hardware, enabling, for example an application executing on device 202 to detect that subscriber 209 and subscriber 211 are near subscriber 201, and are contacts in the contact list of subscriber 201. Regardless of which method is used to determine proximity of contacts/subscribers, the group manager apparatus 200 is made aware of such proximity via the carrier network 220. The group manager apparatus 200 creates an ad-hoc group 224, comprised of the contact information of all the proximate subscribers who meet the group criteria. The group criteria is only those proximate subscribers who are in each other's contact list, or have a common contact who is also present in the current location. The ad-hoc group 224 is transmitted to the devices 202-212. According to exemplary embodiments, the location based ad-hoc group information comprises group contact identifiers (e.g., telephone numbers presented as contact names if available in his or her address book), location properties such as coordinates and radius information, which may be presented as a location name, if available, date and time of the ad-hoc group creation, messages sent in this group, by whom they were sent and when, feedback regarding delivery, reading, typing of a message, and the like.

In some embodiments, the ad-hoc group 224 contains the contact information of all subscribers in the radius 230 who are linked through a social network. In other embodiments, the ad-hoc group 224 may contain only those subscribers who are common contacts of each other. In yet another embodiment, secondary or tertiary contacts may be included in the ad-hoc group 224 wherein the common contact is also present in the current location. The contact information and contact list information of each subscriber can be obtained by requesting the information from each device within the proximate radius. In some embodiments, a social graph may be available on a messaging server, and the list of proximate subscribers can be filtered to the users in the current location. The group manager apparatus 200 is configurable to account for different contact hierarchies and level of relationships to incorporate (for example, $3^{rd}$, $4^{th}$ and $5^{th}$ degree contacts) in the ad-hoc group 224 according to user and/or operator preference.

Figure 3:
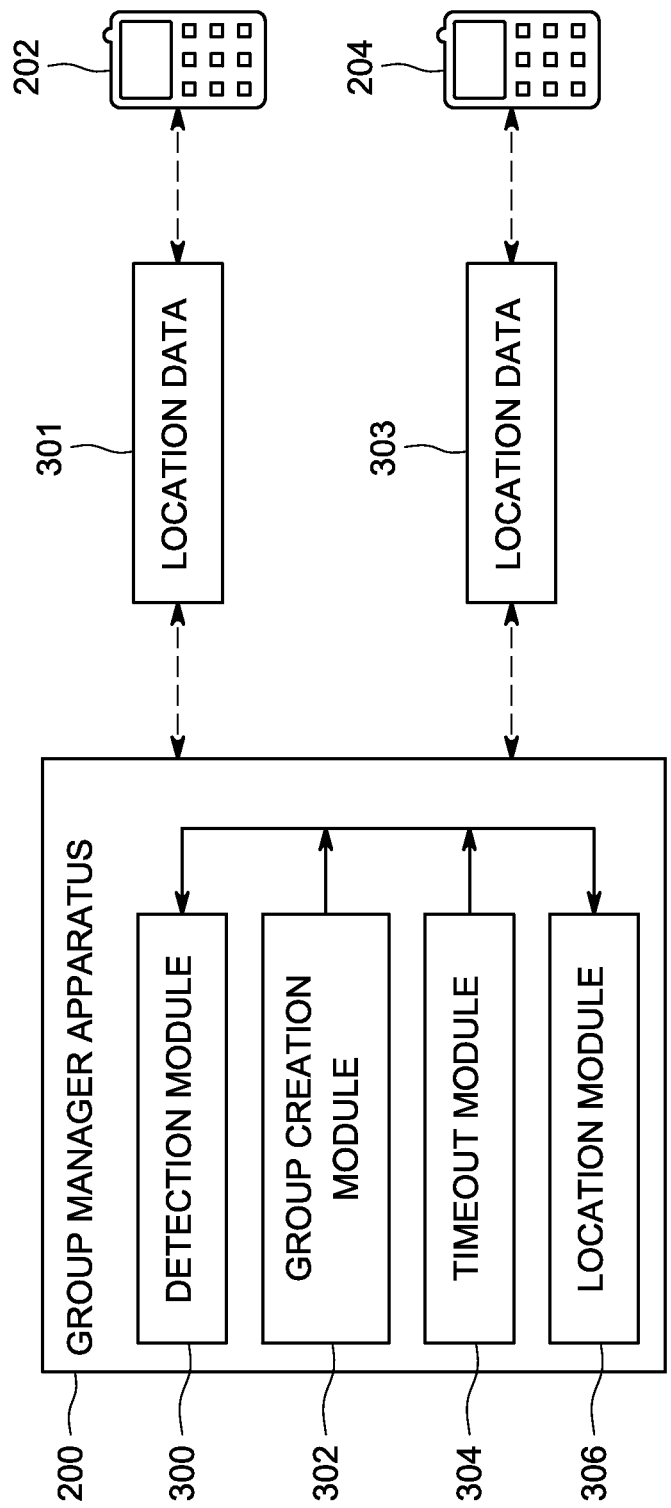
FIG. 3 is a block diagram of the group manager apparatus in accordance with exemplary embodiments of the present invention.

The ad-hoc group 224 is added to the user's conversations application, as shown in FIG. 3 in detail. In other embodiments, the ad-hoc group is added to each subscriber's contact list, enabling group messaging and communication between the proximate subscribers. In some embodiments, the ad-hoc group is sent via an SMS message that is interpreted and parsed by the telephony application on the user's device. The telephony application then modifies the contact list directly. In other instances, the ad-hoc group 224 is transmitted to the devices via system messages, session initiation protocol (SIP) messages via the carrier network 220, "push messages" via any data network, or any combination of the aforementioned methods.

In the instance where the devices evaluate proximity of subscribers via near-field communication (NFC) sensors, the group manager apparatus 200 may be executed as a software module on each device 202-212, and each device adds the ad-hoc group 224 locally. For example, if no network connectivity is available on the carrier network 220, a local group messaging system can be enabled via the near-field sensors of each device in one embodiment of the present invention.

At some point in time after the creation of ad-hoc group 224, it is likely that the subscribers 201-211 have left the proximity radius 230. In some instances, it is desirable for the ad-hoc group 224 to be immediately terminated. Accordingly, a group timeout 226 is sent at the time the group disperses beyond the proximity radius 230. In other instances, group messaging may be desired even after the group has dispersed, thus the group manager apparatus 200 may be configured for a timeout period, after which the group timeout 226 is transmitted to the devices 202-212 via the carrier network 220. Once the devices 202-212 receive the group timeout 226, each device removes the ad-hoc group 224 from their contact list to prevent the contact list from becoming cluttered with ad-hoc groups. According to some embodiments, the telephony application (for example, VoIP Application), may poll for the group timeout 226, or may receive the group timeout 226 directly, and modify the contact list of a device, removing the ad-hoc group 224. According to yet another embodiment, the group timeout 226 is only applied to unused ad-hoc groups. Those groups that were used and have a conversation history are retained along with the rest of the conversations, subject to the standard message retention policy for the particular conversation application being used.

FIG. 3 is a block diagram of the group manager apparatus 200 in accordance with exemplary embodiments of the present invention. The group manager apparatus 200 comprises a detection module 300, a group creation module 302, a timeout module 304 and a location module 306. The modules are communicatively coupled to each other to enable data sharing. The group manager apparatus 200 is set to a detection mode when it resides on a remote network or when it is embodied as a software application on a device. The detection module 300 detects subscribers on the carrier network 220.

Once the detection module 300 has detected subscriber devices 202 and 204, for example, the group manager apparatus 200 receives location data 301 and location data 303 from device 202 and device 204, respectively. In some instances the location data 301 and 303 is provided via device sensors, and in other instances the location data 301 and 303 is provided via telephony applications executing on the device 202 and 204. Once the location module 306 has determined that the devices 202 and 204 are within a predetermined threshold range of each other, e.g., within the proximate radius 230, the location module 306 communicates with the group creation module 302. The group creation module 302 adds the contact information of subscriber 201 and subscriber 203 to an ad-hoc group, e.g., ad-hoc group 224 shown in FIG. 1. The ad-hoc group is published/transmitted to the devices 202 and 204 via the carrier network 220 for inclusion in their respective conversation list or contact lists. After a predetermined period of time, the timeout module 304 is activated, and the timeout module 304 generates a group timeout 226 to transmit to the devices 202 and 204. Upon reception of the group timeout message, device 202 and device 204 remove the ad-hoc group from their respective contact lists. In other embodiments, the group timeout message only expires unused ad-hoc groups. Additionally, it may be configured so that unused contact groups are recalculated periodically. For example every ten minutes the ad-hoc group may be recalculated and no expiration date need be defined per group.

Figure 4:
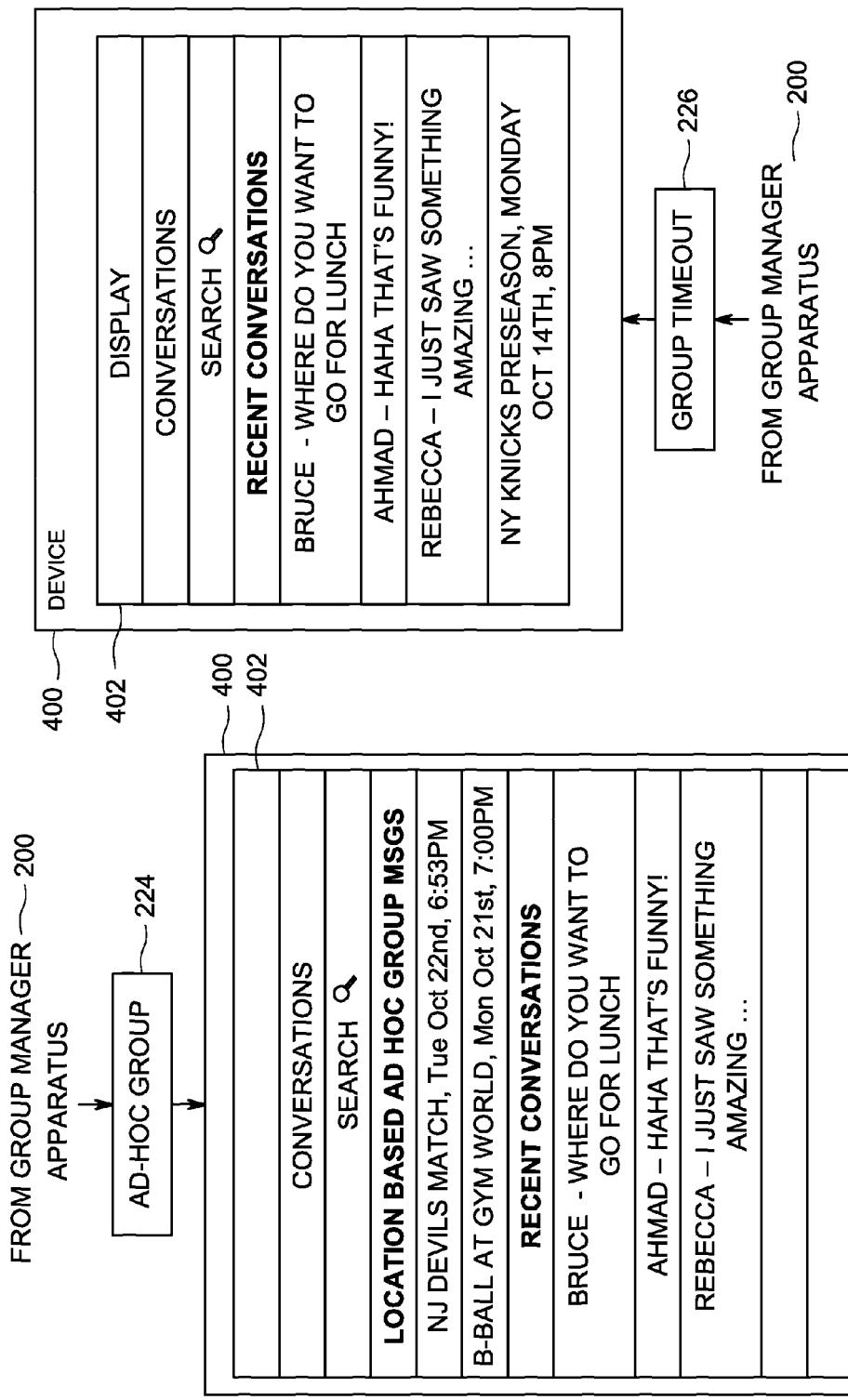
FIG. 4 is an illustration of a graphical user interface with ad-hoc groups in accordance with exemplary embodiments of the present invention.

FIG. 4 is an illustration of a graphical user interface on a device 400 with ad-hoc groups in accordance with exemplary embodiments of the present invention. The device 400 has a display 402, showing a conversation list. The conversation list is displayed showing the most recent conversations, according to user/subscriber preference. When the group manager apparatus 200 generates the ad-hoc group 224, the group is transmitted to the device 400. As shown in FIG. 4, the conversations list now has a sub-heading called "LOCATION BASED AD HOC GROUP MSGS" and lists "NJ DEVILS MATCH, Tue Oct $22^{nd}$, 6:53PM" and "B-BALL AT GYM WORLD, Monday OCT $21^{st}$, 7:00 pm". The names of each group may be created by the group manager apparatus 200 according to the location/event where subscribers are along with a date and time of creation, or according to some other criteria predetermined by configuration of the group manager apparatus 200. Each subscriber may modify the name of the ad-hoc group. A subscriber can compose a message to one of the location based ad-hoc groups, and all contacts in the group will receive the contents of the sent message. After some predetermined period of time, or when the group members disperse out of proximity of each other, the device 400 may receive the group timeout 226, causing the device 400 to remove the group from the contact list. According to some embodiments, each ad-hoc group may have a customized timeout and may receive its own group timeout message, though for simplicity, both ad-hoc groups are shown as removed in FIG. 4. In other instances, only unused ad-hoc groups will be removed, and the two ad-hoc groups which contain messages will remain in the conversations list.

Figure 5:
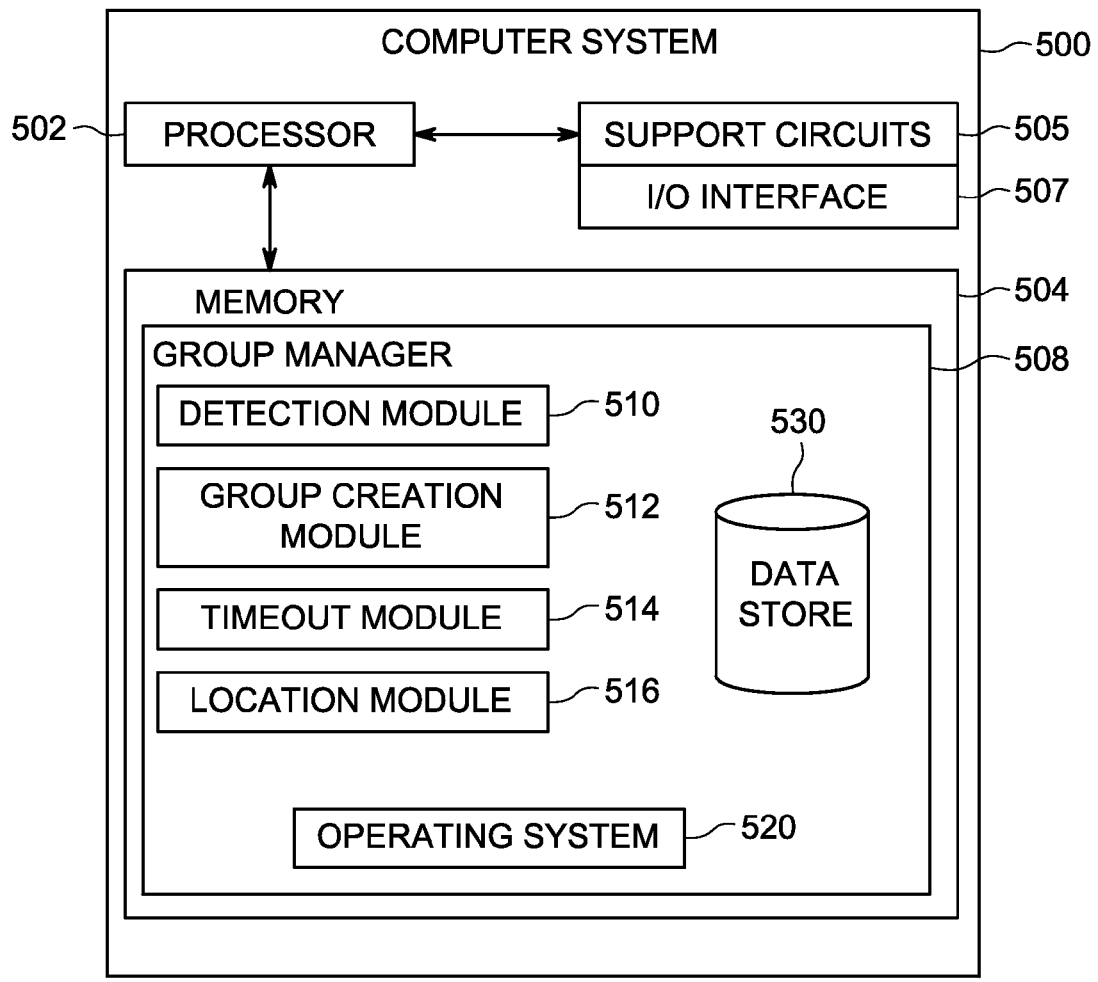
FIG. 5 is a block diagram of a computer system for implementing the group manager apparatus as a software module in accordance with exemplary embodiments of the present invention.

FIG. 5 is a block diagram of a computer system for implementing the group manager apparatus as a software module. The computer system 500 includes a processor 502, various support circuits 505, and memory 504. The processors 502 may include one or more microprocessors known in the art. The support circuits 505 for the processor 502 include conventional cache, power supplies, clock circuits, data registers, I/O interface 507, and the like. The I/O interface 507 may be directly coupled to the memory 504 or coupled through the support circuits 505. The I/O interface 507 may also be configured for communication with input devices and/or output devices such as network devices, various storage devices, mouse, keyboard, display, video and audio sensors and the like.

The memory 504, or computer readable medium, stores non-transient processor-executable instructions and/or data that may be executed by and/or used by the processor 502. These processor-executable instructions may comprise firmware, software, and the like, or some combination thereof. Modules having processor-executable instructions that are stored in the memory 504 comprise a group manager 508 and a datastore 530. The group manager 508 further comprises a detection module 510, a group creation module 512, a timeout module 514 and a location module 516.

The computer system 500 may be programmed with one or more operating systems 520, which may include OS/2, Linux, SOLARIS, UNIX, HPUX, AIX, WINDOWS, 10S, and ANDROID among other known platforms.

The memory 504 may include one or more of the following: random access memory, read only memory, magneto-resistive read/write memory, optical read/write memory, cache memory, magnetic read/write memory, and the like, as well as signal-bearing media as described below.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Figure 6:
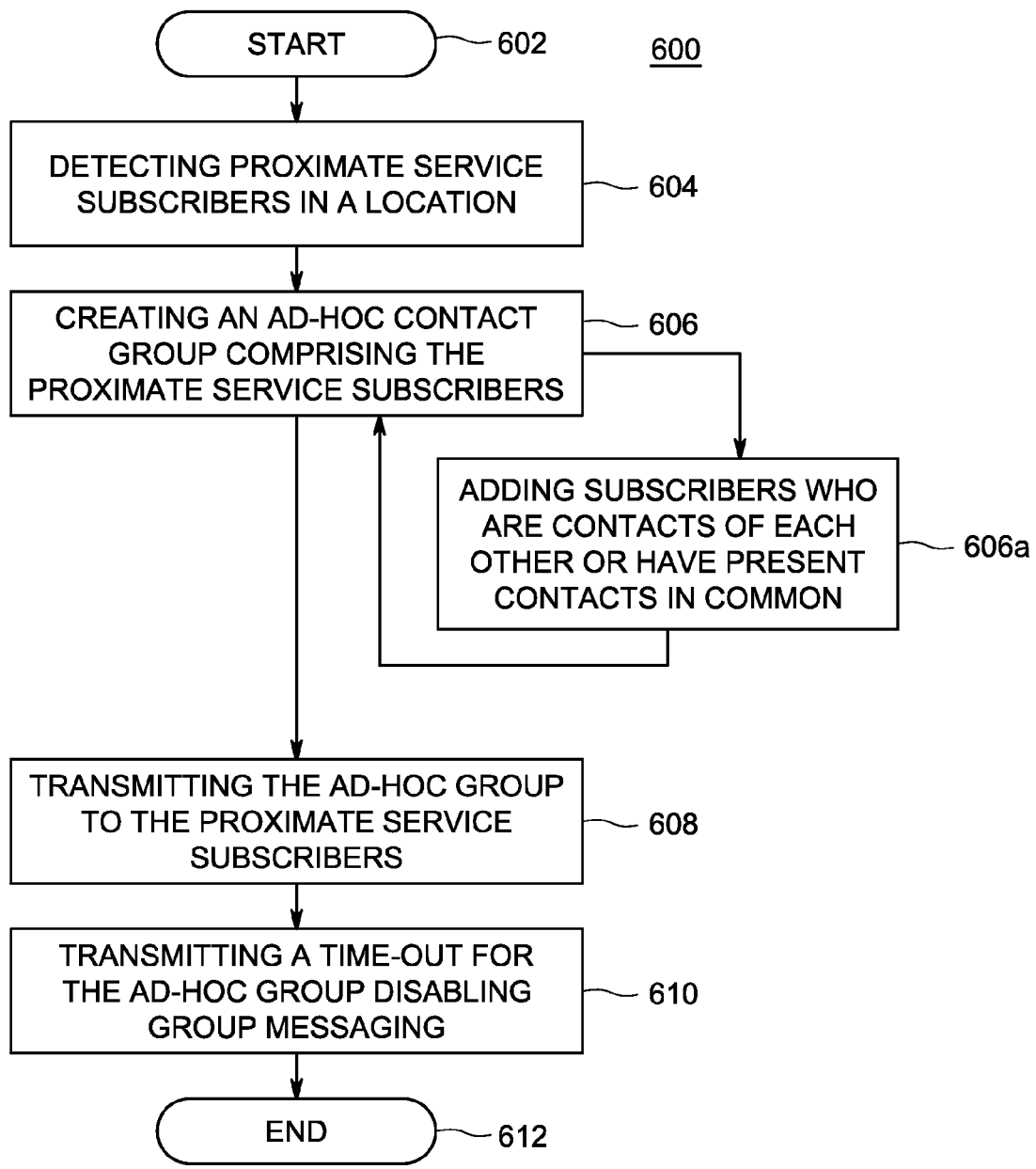
FIG. 6 is a flow diagram of a method for location based ad-hoc group messaging in accordance with exemplary embodiments of the present invention.

FIG. 6 is a flow diagram of a method 600 for location based ad-hoc group messaging in accordance with exemplary embodiments of the present invention. Method 600 illustrates an exemplary flow of actions taken by the group manager 508 stored in memory 504 and executed by the processor 502 of computer system 500. The computer system 500 is an exemplary implementation of the group manager apparatus 200 shown in FIG. 2.

The method begins at step 602 and proceeds to step 604. At step 604, the detection module 510 detects proximate service subscribers in a location or within a particular radius from one of the subscribers. The detection module 510 may be configured for various radii to be customizable for various events and locations. The subscribers need not be subscribed to the same subscription service, but may only be contacts of each other, or have common contacts.

The method proceeds to step 606, where the group creation module 512 creates an ad-hoc contact group comprising the proximate service subscribers, and, in optional sub-step 606a, their $n^{th}$ degree contacts, where n is a customizable limit variable and the common contact is also present. For instance, in some exemplary embodiments, only $1^{st}$ degree contacts are added to the list, i.e., mutual contacts. In other instances $2^{nd}$ degree contacts may also be added. Those of ordinary skill in the art will recognize that, if given a set of subscribers, first degree contacts will be those contacts who are mutual contacts of each other. Second degree subscribers are contacts of one or more of a subscriber's contacts, and so on. The group creation module 512 may be permitted to access the contact list of each proximate subscriber. Subsequently, the method proceeds to step 608, where the ad-hoc group is transmitted to the proximate service subscribers, enabling group messaging and communication between the proximate subscribers.

At step 610, after a predetermined time after the creation of the ad-hoc group, a group time-out message is sent to each subscriber's device by the timeout module 514. In one embodiment, the devices may disable the ad-hoc group or group messaging upon reception of the group time-out message. In other embodiments, the device may remove the ad-hoc group altogether from the subscriber conversation list. The method terminates at step 612. In yet another embodiment, only unused ad-hoc groups are removed from the conversation list.

While the foregoing is directed to embodiments of the present invention, other and further embodiments of the invention may be devised without departing from the basic scope thereof, and the scope thereof is determined by the claims that follow.

The invention claimed is:

1. A method for creating ad-hoc groups for messaging, comprising:
   detecting two or more subscribers proximate a common location;
   creating an ad-hoc group including information of the two or more subscribers proximate the common location, wherein creating the ad-hoc ,group further includes:
      obtaining contact list information from each device of the two or more subscribers proximate the common location; and
      creating the ad-hoc , group based on the contact list information obtained, wherein the ad-hoc, group includes contact information of secondary contacts of subscribers associated with the ad-hoc , group, and wherein the secondary contacts are contacts of at least one of the subscribers associated with the ad-hoc, group;
   transmitting information associated with the ad-hoc group to a device of each of the two or more subscribers of the ad-hoc group; and
   transmitting a group time-out message to each subscriber device in the ad-hoc group after determining that at least one of the two or more subscribers is no longer proximate the common location and transmitting the group time-out message periodically, wherein the message includes a request that each subscriber device remove the ad-hoc group.

2. The method of claim 1, wherein the ad-hoc group created includes contact information for subscribers based on the contact list information obtained.

3. The method of claim 1, further comprising:
   transmitting a request to each subscriber device in the ad-hoc group to add the ad-hoc group as a contact group in a contact list associated with each of the subscribers in the ad-hoc group.

4. The method of claim 1, further comprising:
   one or more of transmitting a group time-out message after a period of time to each subscriber device in the ad-hoc group including a request that each subscriber device remove the ad-hoc group, or periodically removing ad-hoc groups which are unused.

5. The method of claim 1, further comprising:
   transmitting a group time-out message after a period of time to each subscriber device in the ad-hoc group including a request that each subscriber device disable the ad-hoc group.

6. The method of claim 1, wherein detecting two or more subscribers proximate the common location further comprises determining whether the two or more subscribers are within a radius of proximity to each other.

7. The method of claim 1, wherein detecting two or more subscribers proximate the common location includes obtaining geolocation information from at least one of the two or more subscribers proximate the common location.

8. The method of claim 7, wherein the geolocation information obtained from each device is at least one of global positioning satellite (GPS) information, or near-field communication (NFC) information.

9. An apparatus for ad-hoc group messaging comprising:
   a memory;
   a processor executing instructions stored in the memory, wherein the processor includes:
   a detection module configured to detect two or more subscribers proximate a common location;
   a group creation module configured to create an ad-hoc group including information of the two or more subscribers proximate the common location, wherein the group creation module is configured to create the ad-hoc, group by:
      obtaining contact list information from each device of the two or more subscribers proximate the common location; and creating the ad-hoc, group based on the contact list information obtained, wherein the ad-hoc, group includes contact information of secondary contacts of subscribers associated with the ad-hoc, group, and wherein the secondary contacts are contacts of at least one of the subscribers associated with the ad-hoc, group, and configured to transmit information associated with the ad-hoc group to a device of each of the two or more subscribers of the ad-hoc group; and a timeout module configured to transmit a group time-out message to each subscriber device in the ad-hoc group after determining that at least one of the two or more subscribers is no longer proximate the common location and transmitting the group time-out message periodically, wherein the message includes a request that each subscriber device remove the ad-hoc group.

10. The apparatus of claim 9, wherein the ad-hoc group includes contact information for subscribers based on the contact list information obtained.

11. The apparatus of claim 9, further comprising:

a timeout module configured to transmit a group time-out message after a period of time to each subscriber device in the ad-hoc group including a request that each subscriber device remove the ad-hoc group or periodically remove unused ad-hoc groups.

12. The apparatus of claim 9, further comprising:

a timeout module configured to transmit a group time-out message after a period of time to each subscriber device in the ad-hoc group including a request that each subscriber device disable the ad-hoc group.

13. The apparatus of claim 9, wherein the detection module is further configured to determine whether the two or more subscribers are within a radius of proximity to each other using a location module.

14. The apparatus of claim 13, wherein the location module is configured to obtain geolocation information from at least one of the two or more subscribers proximate the common location.

15. The apparatus of claim 14, wherein the geolocation information is at least one of global positioning satellite (GPS) information or near-field communication (NFC) information.

* * * * *